(12) United States Patent  
Siciak et al.

(10) Patent No.: US 10,393,873 B2  
(45) Date of Patent: Aug. 27, 2019

(54) ADAPTIVE MITIGATION OF ULTRASONIC EMISSION IN VEHICULAR OBJECT DETECTION SYSTEMS

(71) Applicant: FORD GLOBAL TECHNOLOGIES, LLC, Dearborn, MI (US)

(72) Inventors: Raymond C. Siciak, Ann Arbor, MI (US); Kathryn Hamilton, West Bloomfield, MI (US); Mahrdad Damsaz, Dexter, MI (US); Vivekananda Krishnamurthy, Belleville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 130 days.

(21) Appl. No.: 15/722,307

(22) Filed: Oct. 2, 2017

(65) Prior Publication Data

US 2019/0101642 A1 Apr. 4, 2019

(51) Int. Cl.

| | |
|---|---|
| *G01S 15/10* | (2006.01) |
| *G01S 7/52* | (2006.01) |
| *G01S 13/93* | (2006.01) |
| *G01S 15/93* | (2006.01) |
| *G01S 15/02* | (2006.01) |
| *G01S 15/66* | (2006.01) |
| *G01S 15/00* | (2006.01) |

(52) U.S. Cl.  
CPC ............... *G01S 15/10* (2013.01); *G01S 7/52* (2013.01); *G01S 7/52004* (2013.01); *G01S 13/931* (2013.01); *G01S 15/003* (2013.01); *G01S 15/025* (2013.01); *G01S 15/66* (2013.01); *G01S 15/931* (2013.01)

(58) Field of Classification Search  
CPC ...... G01S 15/10; G01S 15/931; G01S 15/025; G01S 13/931; G01S 13/04; G01S 13/865; G01S 7/52; G01S 7/497; G01S 7/524; G01S 17/023; G01S 17/87  
See application file for complete search history.

(56) References Cited

U.S. PATENT DOCUMENTS 5,471,215 A * 11/1995 Fukuhara .............. G01S 7/2926  
342/70  
5,483,501 A 1/1996 Park et al.  
(Continued)

*Primary Examiner* — Helen C Kwok  
(74) *Attorney, Agent, or Firm* — Frank L. Lollo; MacMillan, Sobanski & Todd, LLC

(57) ABSTRACT

Remote object detection in an automotive vehicle includes an ultrasonic sensor for emitting ultrasonic bursts from an ultrasonic transducer at a standard rate. At least one object is tracked which reflects the ultrasonic bursts to the sensor. The transducer is adaptively set to emit ultrasonic bursts at a reduced rate which is less than the standard rate based on a result of the object tracking. In one embodiment, the ultrasonic bursts are set at the reduced rate when the tracked object is maintaining a stable relative position. The stable relative position may be comprised of the tracked object having a relative velocity less than a threshold. In another embodiment, extrinsic ultrasonic bursts originating from the tracked object and subsequent echoes between the automotive vehicle and the tracked object can be used by the vehicle to monitor the tracked object while emission of bursts from the vehicle are switched off.

10 Claims, 5 Drawing Sheets

(56) References Cited

U.S. PATENT DOCUMENTS

| | | | | |
|---|---|---|---|---|
| 5,714,928 | A * | 2/1998 | Sudo | B60T 7/22 |
| | | | | 340/435 |
| 6,268,803 | B1 * | 7/2001 | Gunderson | B60Q 9/006 |
| | | | | 180/168 |
| 7,079,450 | B2 | 7/2006 | Breed et al. | |
| 7,403,102 | B2 * | 7/2008 | Fukuda | G01S 15/931 |
| | | | | 340/435 |
| 7,689,360 | B2 * | 3/2010 | Horikawa | B60R 21/0134 |
| | | | | 307/10.1 |
| 8,014,921 | B2 | 9/2011 | Rao et al. | |
| 8,136,404 | B2 * | 3/2012 | Matsumoto | G01S 7/527 |
| | | | | 180/274 |
| 8,648,702 | B2 | 2/2014 | Pala | |
| 9,224,297 | B2 | 12/2015 | Sahffer et al. | |
| 9,411,046 | B2 | 8/2016 | Spiegel | |
| 2014/0195072 | A1 * | 7/2014 | Graumann | G01S 5/0072 |
| | | | | 701/2 |
| 2015/0083921 | A1 * | 3/2015 | Ooyabu | G01S 7/481 |
| | | | | 250/341.8 |
| 2017/0176594 | A1 * | 6/2017 | Ichikawa | G01S 7/524 |
| 2017/0214746 | A1 * | 7/2017 | Zettler | G01S 7/006 |
| 2017/0254888 | A1 * | 9/2017 | Tsuzuki | G01S 7/526 |
| 2017/0294125 | A1 * | 10/2017 | Matsuura | G01S 7/524 |
| 2018/0196133 | A1 * | 7/2018 | Sun | G01S 15/931 |

* cited by examiner

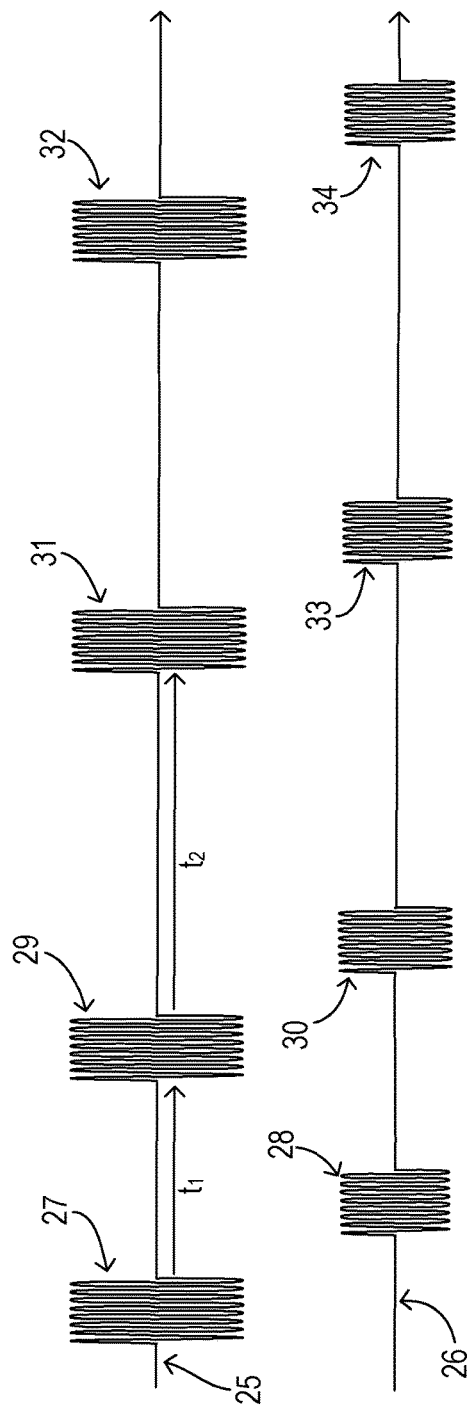
Fig. 2A
Fig. 2B
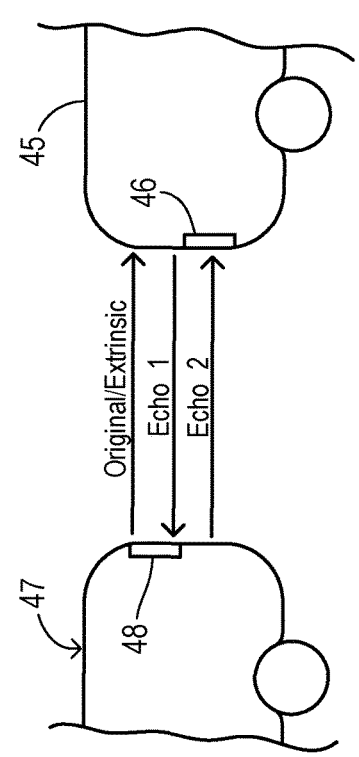
Fig. 5
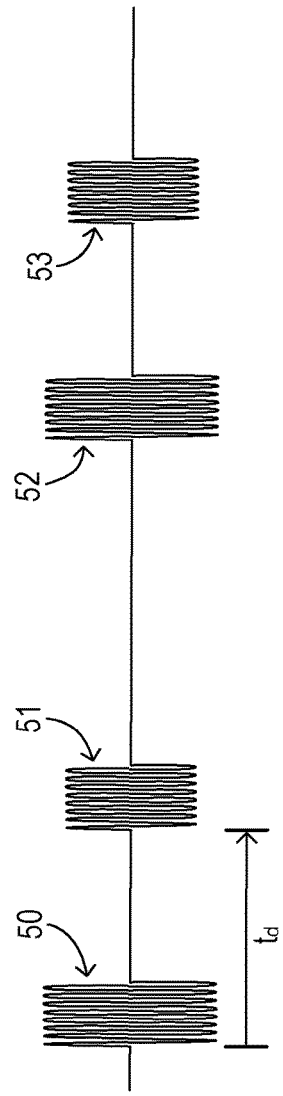
Fig. 6

ADAPTIVE MITIGATION OF ULTRASONIC EMISSION IN VEHICULAR OBJECT DETECTION SYSTEMS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive remote sensing systems, and, more specifically, to ultrasonic sonar systems having reduced ultrasonic emission.

With the increasing development of driver-assistance and autonomous features, modern vehicles are accumulating a large suite of sensors to monitor and measure the driving environment. Ultrasonic sensors, which measure short-range distance using radiated ultrasonic sound waves, are inexpensive additions to an assortment of sensors typically used in passenger vehicles. They are used to augment or add redundancy to features such as parking assist, collision avoidance, and adaptive cruise control.

Ultrasonic sound energy is inaudible to passengers since it is beyond the range of human hearing. Direct application of ultrasound to the human body (e.g., as in ultrasonic imaging) is being studied for its biological effects. In the context of factory/working environments, some jurisdictions have adopted exposure limits due to potential complaints of nausea, headaches, dizziness, confusion, and stomach pain from workers using drills, welding tools, or other industrial equipment which can generate ultrasound at high volume levels. Although incidental exposure to ultrasound generated by automotive sensors does not present health risks, it may nevertheless be desirable to reduce exposure. For example, there may be potential effects on sensitive electronics brought by a passenger into the vehicle or being used by nearby persons (e.g., pedestrians) or in other vehicles. It may also be desirable to consider the potential impact on nearby animals like bats or insects, some of which depend on ultrasonic sound ranges for mating, prey, communication, and navigation.

In high-traffic situations where vehicle density on a roadway is high, multiple ultrasonic-equipped vehicles may be driving close to each other. Even though interference between nearby systems may not cause problems for object detection and tracking, the presence of multiple systems causes even louder ultrasonic sound levels in the surrounding environment due to the additive nature of noise. It would be desirable to reduce ultrasonic emissions during such conditions.

SUMMARY OF THE INVENTION

In one aspect of the invention, an object detection apparatus for an automotive vehicle comprises an ultrasonic range sensor having at least one ultrasonic transducer for generating ultrasonic bursts at a controllable rate. A controller tracks at least one object which reflects the ultrasonic bursts to the sensor. The controller provides a command signal to the sensor to adaptively set the controllable rate according to a result of the object tracking. For example, the controller sets the controllable rate to a standard rate, except for setting the controllable rate to a reduced rate which is less than the standard rate when the tracked object is maintaining a stable relative position.

In another embodiment, the controller is configured to identify extrinsic ultrasonic bursts originating from the tracked object and echoes of the extrinsic ultrasonic bursts resulting from multiple reflections between the automotive vehicle and the tracked object. The controller calculates an extrinsic distance to the tracked object using the extrinsic ultrasonic bursts and the echoes. The ultrasonic bursts generated by the ultrasonic range sensor are temporarily switched off if the calculated distance and the extrinsic distance are matching (i.e., substantially the same).

In another embodiment, the vehicle also includes a camera-based tracking system in the automotive vehicle for using image analysis to determine a visually-determined distance to a tracked object. A difference between the sonar distance and the visually-determined distance is used to determine a calibration factor for adjusting the visually-determined distance. After determining the calibration factor, the ultrasonic bursts generated by the ultrasonic range sensor can be switched off while the visually-determined distance continues to be monitored. The ultrasonic bursts generated by the ultrasonic range sensor are switched back on when the camera-based tracking system no longer tracks the tracked object.

BRIEF DESCRIPTION OF THE DRAWINGS

FIGS. 2A and 2B are waveform diagrams of an emitted signal and a received signal, respectively, occurring at two different burst rates.

FIG. 5 is a diagram showing extrinsic ultrasonic bursts and multiple echoes used in another embodiment for reducing ultrasound emission.

FIG. 6 is a waveform diagram showing extrinsic bursts and echoes.

DETAILED DESCRIPTION OF PREFERRED EMBODIMENTS

Figure 1:
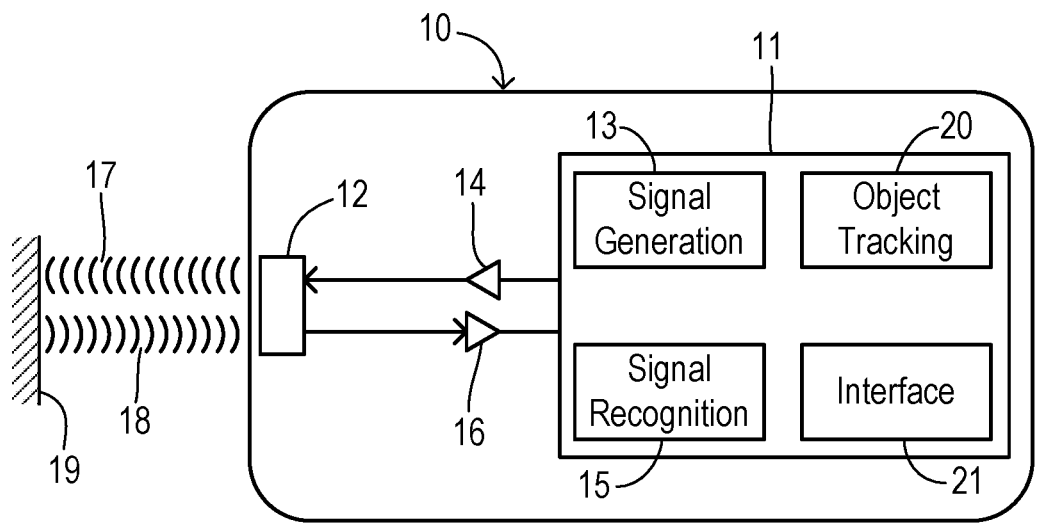
FIG. 1 is a diagram showing a vehicle equipped with an ultrasonic remote sensing systems of the invention.

Referring to FIG. 1, an automotive vehicle 10 has a remote object tracking system (such as a parking assist system, collision avoidance system, backup warning system, or other advanced driver assistance system) with a controller 11 coupled to an ultrasonic range sensor 12. Sensor 12 has at least one ultrasonic transducer and acts as an ultrasonic transceiver which emits and receives ultrasonic sound to perform a sonar function for detecting nearby objects using reflected ultrasonic waves. Typical ultrasonic sensors already being used commercially on vehicles transmit ultrasound at around 40 kHz to around 45 kHz, but frequencies from 30 kHz up to over 100 kHz can be used. Controller 11 includes a signal generation block 13 coupled to sensor 12 via an amplifier 14 and a signal recognition block 15 coupled to sensor 12 via an amplifier 16.

Ultrasonic range sensor 12 emits an ultrasonic beam 17 which can reflect off a remote object 19 (e.g., a nearby vehicle) sending an echo 18 back to sensor 12. Signal recognition block 15 detects echo 18 and determines a time delay that determines the relative distance to object 19. An object tracking block 20 monitors a changing position of object 19. Based on the position or the changing position of object 19, an interface 21 may generate a warning to the driver or may exercise control over the steering or braking of vehicle 10.

In the typical sonar-type object tracking function, the ultrasonic wave is generated in bursts emitted toward a desired detection zone. Each burst has a particular duration and may include amplitude and/or frequency modulation during the burst to facilitate recognition of the return echoes. Bursts are repeated at a burst repetition rate that is sufficient to ensure that the velocity of moving objects can be accurately assessed. In the present invention, the burst rate is controllable. For example, there may be a higher, standard burst rate in normal situations and a reduced rate used in other situations. In other embodiments, the burst rate may be temporarily switched off while continuing to detect ultrasonic signals from extrinsic sources. Thus, signal generation block 13 provides a command signal that adaptively sets the controllable burst rate according to various results of the object tracking function.

FIG. 2A shows an ultrasonic transmission signal 25 emitted by the ultrasonic transducer acting as an ultrasonic speaker, and FIG. 2B shows an ultrasonic reception signal 26 picked up by the ultrasonic transducer acting as an ultrasonic microphone. After a first ultrasonic burst 27 is emitted, a reflected echo 28 is received after a time delay that identifies the distance to a remote object within the detection zone of the sensor. A second burst 29 is emitted after a time $t_1$ corresponding to a standard burst rate, and a subsequent echo 30 again determines a measured sonar distance to the tracked object. Under certain conditions, it is possible to reduce the burst rate (i.e., increase the time delay between adjacent bursts). Thus, the controllable burst rate may be stretched out by emitting subsequent ultrasonic bursts 31 and 32 each after waiting for a time t2 from the previous burst corresponding to a reduced burst rate. Echoes 33 and 34 provide an object tracking distance at a slower rate of updates, which is acceptable under the special conditions.

For example, vehicles using ultrasonic sensors in stop-and-go traffic can decrease the burst rate of their ultrasonic speakers when there is a low rate of change in measured distance, or in other words, when there is little activity or movement. When the relative distance to a tracked object begins to change (e.g., when the vehicle ahead begins to move again after stopping), the ultrasonic system can resume its normal burst rate to update the distance at a frequency required for a prompt reaction. This modification has the potential to greatly minimize the impact of ultrasonic emissions by significantly decreasing the total amount of ultrasound suffusing the surroundings.

Figure 3:
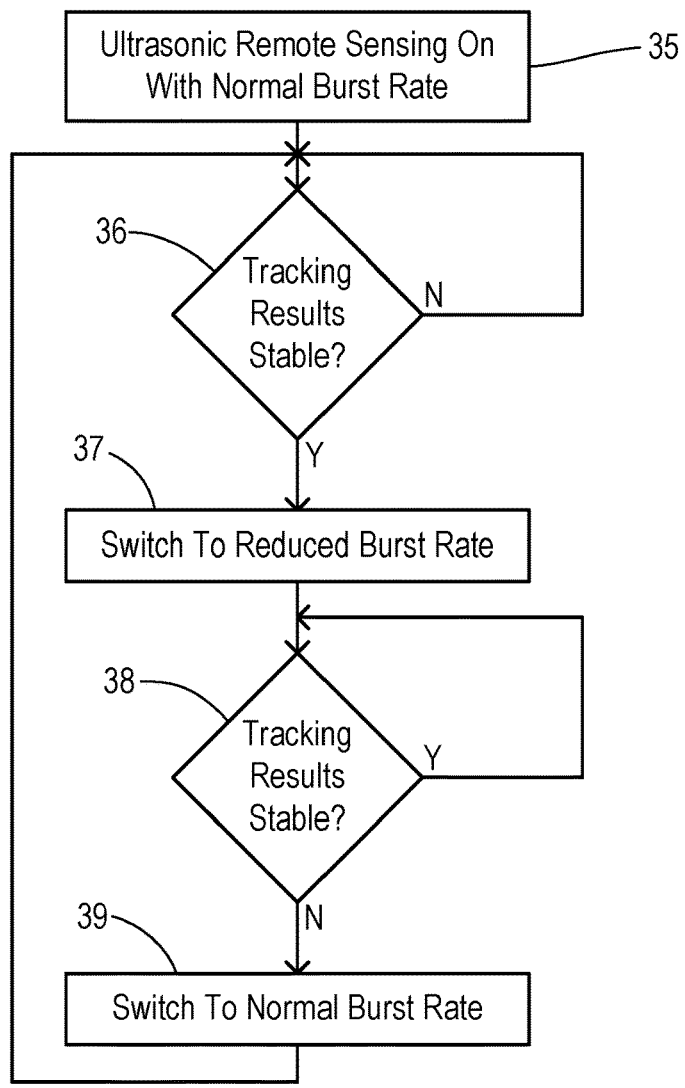
FIG. 3 is a flowchart showing one preferred method of the invention.

FIG. 3 shows one preferred method wherein ultrasonic remote sensing is being employed using a normal (i.e., standard) burst rate in step 35. The normal rate is configured to enable the updated distance measurements to characterize a velocity or change in velocity of the tracked object quickly enough to provide sufficient reaction time for providing a collision warning and/or taking automatic evasive action. However, when the tracking results being obtained are stable (or have remained stable for a predetermined time), the need for obtaining updates quickly is reduced. Thus, the method checks whether the tracking results (e.g., relative distance of the object) are stable in step 36. If not, then the ultrasonic emission continues at the normal rate and the method continually rechecks for stability in step 36. If the results are stable, then a command signal is sent to the sensor that causes a switch to a reduced burst rate in step 37. While continuing to track the object using the reduced rate, the method checks whether the tracking results are still stable in step 38. If so, then step 37 continually rechecks the stability. If not, then a command signal is sent to the sensor that causes a switch back to the normal burst rate in step 39, and the method returns to step 36.

Figure 4:
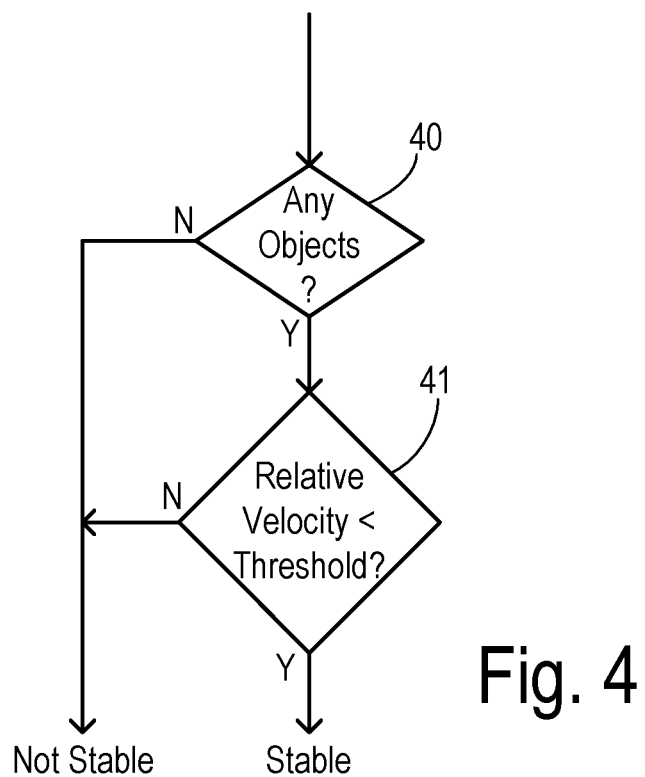
FIG. 4 is a flowchart showing one preferred method for detecting stable tracking in FIG. 3.

An example method for checking stability is shown in FIG. 4. Step 40 checks whether any object is currently being tracked. If not, then it cannot be assumed that there is a stable condition and it is concluded that the conditions are not stable. If an object is being tracked, then a check is performed in step 41 to determine whether the relative velocity of the tracked object is less than a threshold. If not, then the conditions are not stable. If the velocity is below the threshold, then the condition is judged to be stable.

A second embodiment of the invention utilizes ultrasonic bursts being emitted by other vehicles in a manner that allows a host vehicle to suspend its own emissions. As shown in FIG. 5, a host vehicle 45 carries an ultrasonic range sensor 46. A nearby vehicle 47 carries its own ultrasonic sensor 48. Vehicles 45 and 47 are arranged such that sonar operation on vehicle 47 causes its sensor 48 to emit ultrasonic waves toward ultrasonic sensor 46 on vehicle 45. In conventional systems, these extrinsic ultrasound bursts are ignored by the sonar system in vehicle 45 since they do not match any intrinsic ultrasound bursts being emitted by sensor 46. However, as shown in FIG. 5, the original, extrinsic ultrasonic burst may often have sufficient power to reflect multiple times between vehicles 45 and 47. Reflection of the extrinsic ultrasound by host vehicle 45 produces an Echo #1 which propagates back toward vehicle 47 where it is again reflected to produce an Echo #2 directed back to sensor 46 on vehicle 45. FIG. 6 illustrates extrinsic bursts 50 and 52 as received by sensor 46 on host vehicle 45 and subsequent second echo bursts 51 and 53 that are also received by sensor 46. Provided there is sufficient signal strength for recognizing the signal properties of the bursts, time delay td identifies a sonar distance between vehicles 45 and 47 in the same way as intrinsic bursts issued from sensor 46.

Figure 7:
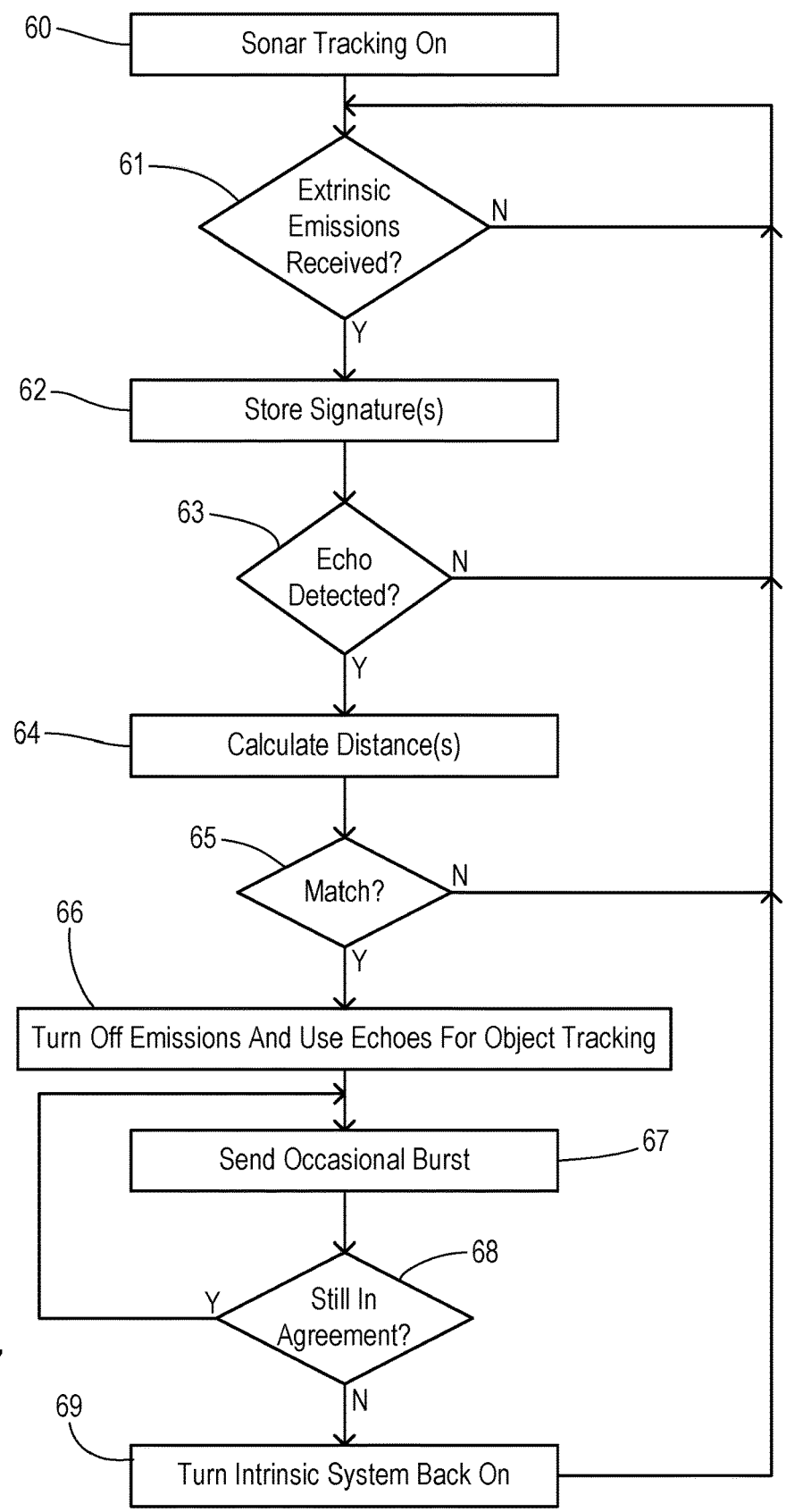
FIG. 7 is a flowchart showing a method of the invention using the extrinsic bursts and echoes.

A preferred method for this second embodiment is shown in FIG. 7. In step 60, a host vehicle is performing object detection and tracking with its ultrasonic sensor activated in a normal mode in step 60. A check is performed in step 61 to determine whether extrinsic ultrasonic emission is received from a nearby vehicle. When extrinsic emission is detected, then a signature or signatures of the received emissions (e.g., burst frequency, duration, and/or modulation) is stored in step 62. Following storage of at least one signature, step 63 checks for a received echo having a matching signature. In order to differentiate an echo from another direct emission of an original burst from the nearby vehicle, the check may include an examination of the signal amplitudes. A burst identified as a potential echo should have an amplitude reduced by a projected amount based on reflection and propagation losses. If no matching echo is detected, then a return is made to step 61.

If an echo is verified as being a result of a previously received direct burst from the nearby vehicle, then a sonar distance is calculated in step 65 based on a time difference between the extrinsic direct burst and the echo. In step 65, a check is performed to determine whether the calculated extrinsic distance matches the calculated distance as determined using active bursts from the ultrasonic sensor onboard the host vehicle. Criteria for a match can include the extrinsic distance being within a predetermined percentage of the onboard calculated distance. If there is no match, then the method returns to step 61.

When a match is detected in step 65, emissions from the ultrasonic transducer onboard the host vehicle can be turned off and then matched pairs of the extrinsic, direct bursts and the corresponding echo bursts are used to calculate the sonar distance. In order to ensure proper ongoing determination of the sonar distance, an occasional ultrasonic burst is emitted from the onboard, intrinsic ultrasonic sensor and a corresponding calculated distance is compared to the extrinsic distance. A check is performed in step 68 to determine whether the two distances are still in agreement (i.e., within a predetermined percentage of each other). If yes, then the method returns to step 67 to occasionally recheck using an intrinsic burst and distance calculation. If they are no longer in agreement, then the intrinsic ultrasonic sensor is turned back on in step 69 and the method returns to step 61.

Figure 8:
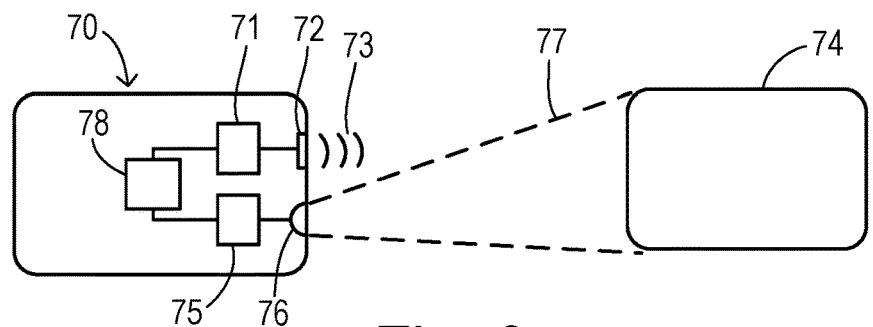
FIG. 8 is a block diagram showing another embodiment of the invention wherein a vehicle includes sonar tracking and camera-based object tracking.

In yet another embodiment as shown in FIG. 8, bumper-to-bumper traffic may present a unique opportunity for sensor fusion. When the same vehicle has been followed for a sufficient amount of time, forward-facing ultrasonic sensors can be used to calibrate or ground-truth the camera images for that vehicle. Distance measurements could be matched frame by frame to camera readings in order to create a visual understanding of depth and distance (by relating ultrasonic distance measurements to the size of the vehicle ahead). This allows the ultrasonic sensors to be turned off until the vehicle ahead changes lanes, or traffic otherwise changes.

A vehicle 70 combines operation of a sonar object detection system 71 with a camera-based tracking system 75 in order to track a nearby vehicle 74. Sonar system 71 has an ultrasonic sensor 72 emitting ultrasonic bursts 73 toward vehicle 74. Camera system 75 includes a camera 76 or other optical sensor to obtain images including nearby vehicle 74. An apparent size 77 within the images is monitored by tracking system 75 to obtain a visually-determined distance (e.g., an estimated actual size for vehicle 74 based on a particular vehicle model or type being recognized in the image is combined with the field of view taken up by the target vehicle in the images in order to derive the visually-determined distance). The visually-determined distance and the sonar distance are provided to a controller 78 which uses a higher accuracy inherent in the sonar distance to improve performance of the camera-based system so that the sonar system can be temporarily turned off.

Figure 9:
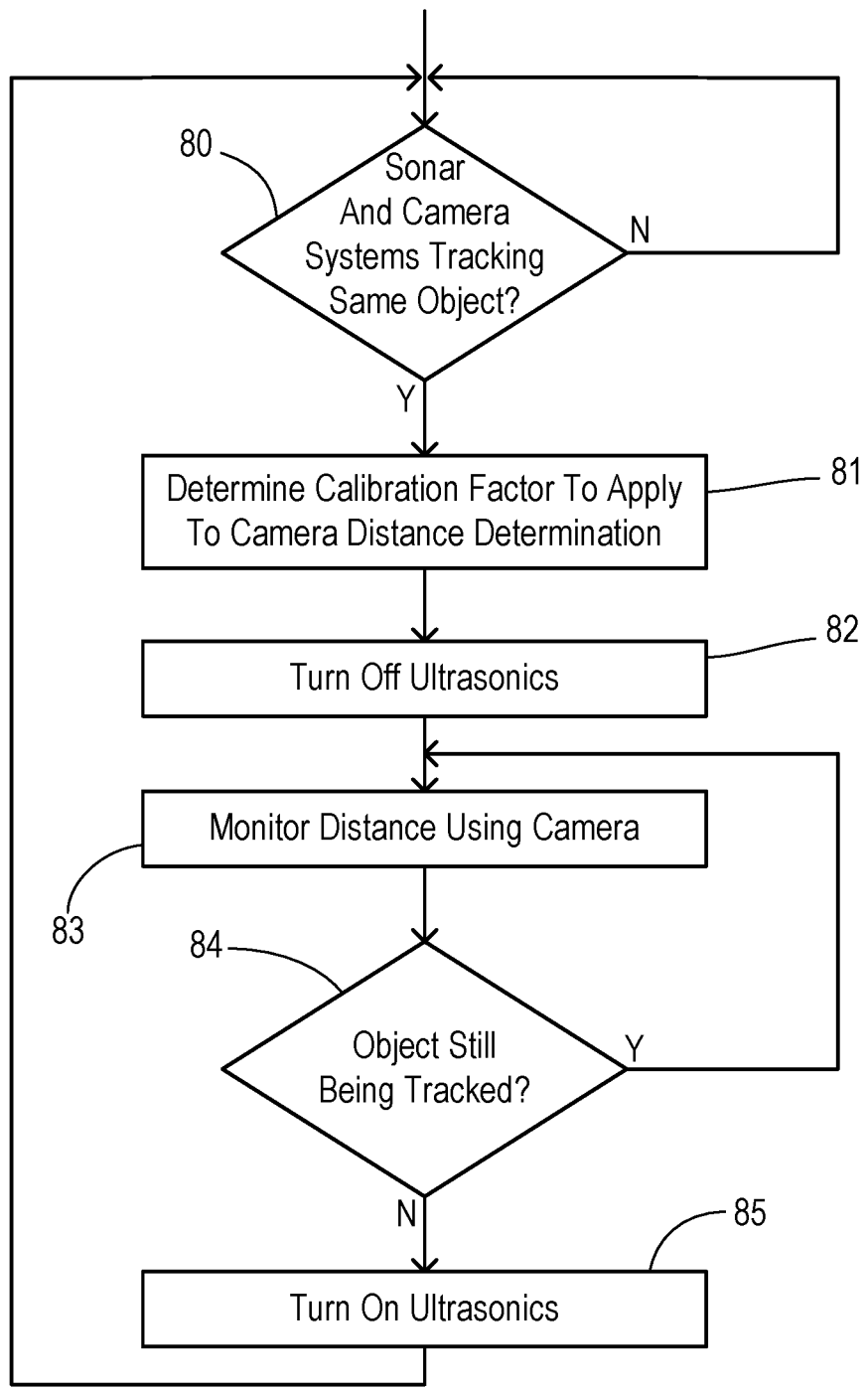
FIG. 9 is a flowchart showing one preferred method of the invention using the tracking systems of FIG. 8.

A preferred method for this embodiment is shown in FIG. 9. A check is performed in step 80 to determine whether the sonar and camera tracking systems are tracking the same object. If they are, then a calibration (i.e., correction) factor is determined in step 81. The calibration factor may be calculated in response to a difference between distances simultaneously obtained by the sonar and camera systems (e.g., as a percentage by which the visually-determined distance can be multiplied in order to match the sonar-determined distance). Once the calibration factor is available, the ultrasonic sensor is turned off in step 82. In step 83, the nearby vehicle is tracked and its distance is continuously monitored with use of ultrasonics. A check is performed in step 84 to determine whether the object (e.g., nearby vehicle) is still being tracked. In other words, it is determined whether the vehicle still occupies the detection zone of the sonar-based system. If yes, then camera monitoring continues by returning to step 83. If not (e.g., if the vehicle changes lanes or enters a different roadway), then the ultrasonics are turned back on and a return is made to step 80.

The different embodiments described herein can be practiced separately or can be combined within a single tracking system. Thus, the amount of ultrasonic emission can be adaptively adjusted so that unnecessary emissions can be avoided.

What is claimed is:

1. Object detection apparatus in an automotive vehicle, comprising:
   an ultrasonic range sensor having at least one ultrasonic transducer for generating ultrasonic bursts at a controllable rate; and
   a controller for tracking at least one object which reflects the ultrasonic bursts to the sensor, wherein the controller provides a command signal to the sensor to adaptively set the controllable rate according to a result of the tracked object, wherein the controller sets the controllable rate to a standard rate, except for setting the controllable rate to a reduced rate which is less than the standard rate when the tracked object is maintaining a stable relative position, and wherein the stable relative position is comprised of the tracked object having a relative velocity less than a threshold.

2. Object detection apparatus in an automotive vehicle, comprising:
   an ultrasonic range sensor having at least one ultrasonic transducer for generating ultrasonic bursts at a controllable rate; and
   a controller for tracking at least one object which reflects the ultrasonic bursts to the sensor, wherein the controller provides a command signal to the sensor to adaptively set the controllable rate according to a result of the tracked object;
   wherein the result of the tracked object includes a calculated distance to the tracked object, wherein the controller is configured to identify extrinsic ultrasonic bursts originating from the tracked object that were not generated by the ultrasonic range sensor and echoes of the extrinsic ultrasonic bursts resulting from multiple reflections between the automotive vehicle and the tracked object, wherein the controller is configured to calculate an extrinsic distance to the tracked object using the extrinsic ultrasonic bursts and the echoes, and wherein the ultrasonic bursts generated by the ultrasonic range sensor are temporarily switched off if the calculated distance and the extrinsic distance are matching.

3. The apparatus of claim 2 wherein the automotive vehicle and the tracked object each includes respective wireless transceivers for conduction a negotiation to select either the automotive vehicle or the tracked object for switching off a respective ultrasonic range sensor.

4. A method of object detection in an automotive vehicle, comprising the steps of:
   emitting intrinsic ultrasonic bursts from an ultrasonic transducer at a standard rate;
   tracking at least one object which reflects the intrinsic ultrasonic bursts to the transducer;
   calculating a distance to the tracked object in response to the reflected intrinsic ultrasonic bursts;

adaptively setting the transducer to emit the intrinsic ultrasonic bursts at a reduced rate which is less than the standard rate according to a result of the tracked object;

identifying extrinsic ultrasonic bursts originating from the tracked object that were not generated by the ultrasonic transducer and echoes of the extrinsic ultrasonic bursts resulting from multiple reflections between the automotive vehicle and the tracked object;

calculating an extrinsic distance to the tracked object using the extrinsic ultrasonic bursts and the echoes;

temporarily switching off the intrinsic ultrasonic bursts emitted by the transducer if the calculated distance and the extrinsic distance are matching; and continuing to calculate the extrinsic distance while the intrinsic ultrasonic bursts are switched off.

5. The method of claim 4 wherein the intrinsic ultrasonic bursts are set at the reduced rate when the tracked object is maintaining a stable relative position.

6. The method of claim 5 wherein the stable relative position is comprised of the tracked object having a relative velocity less than a threshold.

7. The method of claim 4 further comprising the steps of:
periodically switching back on the intrinsic ultrasonic bursts for re-determining the calculated distance;

if the calculated distance and the extrinsic distance are matching, then again temporarily switching off the intrinsic ultrasonic bursts emitted by the ultrasonic transducer; and if the calculated distance and the extrinsic distance are not matching then emitting the intrinsic ultrasonic bursts at the standard rate.

8. The method of claim 4 wherein the automotive vehicle further comprises a camera-based tracking system for using image analysis to determine a visually-determined distance to the tracked object, and wherein the method further comprises the steps of:
determining a sonar distance to the tracked object using the intrinsic ultrasonic bursts;

determining a difference between the sonar distance and the visually-determined distance;

determining a calibration factor in response to the difference for adjusting the visually-determined distance;

after determining the calibration factor, switching off the intrinsic ultrasonic bursts emitted by the ultrasonic transducer while continuing to monitor the visually-determined distance using the calibration factor; and when the camera-based tracking system no longer tracks the tracked object, then switching back on the intrinsic ultrasonic bursts emitted by the ultrasonic transducer.

9. The apparatus of claim 2 wherein the ultrasonic bursts generated by the ultrasonic range sensor are periodically switched back on for re-determining the calculated distance, wherein the ultrasonic bursts generated by the ultrasonic range sensor are again temporarily switched off if the calculated distance and the extrinsic distance are matching, and wherein the controller switches the ultrasonic range sensor back on with the controllable rate set to a standard rate if the calculated distance and the extrinsic distance are not matching.

10. Object detection apparatus in an automotive vehicle, comprising:
an ultrasonic range sensor having at least one ultrasonic transducer for generating ultrasonic bursts at a controllable rate;

a controller for tracking at least one object which reflects the ultrasonic bursts to the sensor, wherein the controller provides a command signal to the sensor to adaptively set the controllable rate according to a result of the tracked object, wherein the result of the tracked object includes a sonar distance to the tracked object; and a camera-based tracking system for using image analysis to determine a visually-determined distance to the tracked object;

wherein a difference between the sonar distance and the visually-determined distance is used to determine a calibration factor for adjusting the visually-determined distance;

wherein after determining the calibration factor, the ultrasonic bursts generated by the ultrasonic range sensor are switched off while the visually-determined distance continues to be monitored; and wherein the ultrasonic bursts generated by the ultrasonic range sensor are switched back on when the camera-based tracking system no longer tracks the tracked object.

* * * * *